United States Patent
Murata

(10) Patent No.: US 8,050,884 B2
(45) Date of Patent: Nov. 1, 2011

(54) METHOD AND APPARATUS FOR DETERMINING THE EMISSIVITY, AREA AND TEMPERATURE OF AN OBJECT

(75) Inventor: Ronald N. Murata, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 796 days.

(21) Appl. No.: 11/951,698

(22) Filed: Dec. 6, 2007

(65) Prior Publication Data

US 2010/0256945 A1    Oct. 7, 2010

(51) Int. Cl.
  *G01K 11/30* (2006.01)
  *G01K 17/00* (2006.01)
  *G01J 5/48* (2006.01)
(52) U.S. Cl. ............... 702/134; 702/136; 356/43; 374/9
(58) Field of Classification Search .................. 702/134; 374/9
  See application file for complete search history.

(56) References Cited

U.S. PATENT DOCUMENTS

| | | | | |
|---|---|---|---|---|
| 5,021,980 A | * | 6/1991 | Poenisch et al. | 702/134 |
| 5,153,563 A | * | 10/1992 | Goto et al. | 340/578 |
| 5,231,595 A | * | 7/1993 | Makino et al. | 702/134 |
| 2005/0045825 A1 | | 3/2005 | Murata | |
| 2010/0100352 A1 | * | 4/2010 | Thro et al. | 702/135 |

FOREIGN PATENT DOCUMENTS

WO    WO 2007/093744 A2    8/2007

OTHER PUBLICATIONS

Spitzberg, R.M., "Tutorial on Target Phenomenology and Optical Discrimination for Midcourse Sensors"; MIT Lincoln Laboratory; NMD Discrimination Working Group; Nov. 14, 2001.
"Mosaic Signal Processing in Nuclear Environments (U)"; Final Technical Report; Oct. 1984; Prepared for: The Ballistic Missile Defense; Advanced Technology Center; Huntsville, Alabama; Contract Monitor: F.M. Hoke.

* cited by examiner

*Primary Examiner* — Jonathan Teixeira Moffat
(74) *Attorney, Agent, or Firm* — Alston & Bird LLP

(57) ABSTRACT

Methods and apparatus are provided to determine the emissivity, temperature and area of an object. The methods and apparatus are designed such that the emissivity and area of the object may be separately determined as functions dependent upon the temperature of the object derived from a three or more band infrared measurement sensor. As such, the methods and apparatus may only require a regression analysis of the temperature of the object without any regression analysis of the emissivity and area of the object.

18 Claims, 7 Drawing Sheets

METHOD AND APPARATUS FOR DETERMINING THE EMISSIVITY, AREA AND TEMPERATURE OF AN OBJECT

FIELD OF THE INVENTION

Embodiments of the present invention relate generally to methods and apparatus for determining the emissivity, area and temperature of an object and, more particularly, to methods and apparatus for determining the emissivity, area and temperature of an object in which the emissivity and area of the object are expressed as functions of the temperature of the object.

BACKGROUND OF THE INVENTION

It is desirable in a variety of applications to determine various features of a target, such as the emissivity, area and temperature of the target, based upon multicolor radiant intensity measurements. For example, in ballistic missile defense and tactical air defense scenarios, the extraction of various features of a target from multicolor radiant intensity measurement facilitates the discrimination of an actual target from a decoy. Additionally, it would be useful to accurately determine the emissivity and temperature of various materials, such as composite materials, during wind tunnel testing. Still further, the determination of various features of a target based upon multicolor radiant intensity measurements can be employed in a wide variety of other applications including medical thermography, observational astronomy, astrophysics and the like.

Various techniques have therefore been developed in order to determine the emissivity, area and temperature of an object based upon multicolor radiant intensity measurements. For example, one technique measures the radiant intensity of an object at each of two different wavelengths, i.e., at two different colors. The temperature of the object is then derived based upon the ratio of the Planck radiances at each of the two wavelengths. Thereafter, the product of the emissivity and the area of the object, that is, the emissivity area, is derived by dividing the radiant intensity of the object that was measured by the Planck function evaluated at the temperature that was previously derived. However, the temperature that is derived is based entirely upon the emissivity of the object with the effects of reflected radiation being neglected. In instances in which the object under investigation is a black body, the temperature which is derived may be relatively unbiased. However, many objects are partially reflective such that the derivation of the temperature of the object based only on the emissivity of the object without taking into account the effects of reflected radiation may cause the temperature which is derived to be biased from the true temperature of the object. Since the emissivity area is dependent upon the temperature that has been derived, the bias that is reflected in the derivation of the temperature similarly causes the emissivity area that is derived to be biased from the true emissivity area of the object.

By way of example, a detector may be configured detect the radiant intensity of an object in two wavebands, namely, a first waveband centered at 6 microns and a second waveband centered at 11.5 microns; each waveband having a bandwidth of 1 micron. In one instance in which the actual temperature of the object was 300 Kelvin and the emissivity area of the object was actually $1 \times 10^4$ cm$^2$, the temperature and the emissivity area of the object was then determined as described above for each of 64 different Monte Carlo trials. In this regard, the radiant intensity measurements include some amount of noise with the amount of noise being permitted to vary from trial to trial. As shown in FIGS. 1A and 1B, the temperature T and emissivity area EA, respectively, of the object that are derived vary somewhat from the actual temperature and emissivity area. In this example, the mean value of the temperature that was derived is 297.863 Kelvin in comparison to the actual temperature of the object being 300 Kelvin. Similarly, the mean of the emissivity area that is derived is $8.709 \times 10^3$ cm$^2$ in comparison to an actual emissivity area of the object of $1 \times 10^4$ cm$^2$. Moreover, the temperature and emissivity area values that were derived tend to vary from trial to trial with the standard deviation of the temperature values that are derived being 1.644 Kelvin and the standard deviation of the emissivity area values that are derived being 232.532 cm$^2$ in this example.

FIG. 2 provides another graphical depiction of an example of this two-color technique in which the temperature T is plotted relative to the emissivity area EA. As shown by the square box 10, the actual temperature is 300 Kelvin and the actual emissivity area is 8,000 cm$^2$. In contrast, the temperatures and emissivity areas that are derived are not only displaced from the actual temperature and emissivity area of the object, but are scattered across a range of temperatures and emissivity areas.

Another technique for extracting target features from multicolor radiant intensity measurements utilizes a three-color algorithm based upon radiant intensity measurements in three distinct wavebands. See, Spitzberg, R. M., Lincoln Laboratory, Tutorial on Target Phenomenology and Optical Discrimination for Midcourse Sensors, NMD Discrimination Working Group (Nov. 14, 2001). Based upon the radiant intensity measurements in each of the three wavebands, the emissivity, area and temperature of an object can be measured with less bias than those techniques that rely upon radiant intensity measurements within only two wavebands. However, the three-color algorithm generally requires separate regression or estimation of each of the emissivity, area and temperature. In this regard, conventional parameter estimation algorithms including the Levenburg Marquardt and Newton iterative solutions are generally required to separately estimate the emissivity, area and temperature of the object. While this three-color algorithm may serve to reduce the bias associated with the emissivity, area and temperature of the object, this three-color algorithm generally requires fairly substantial computational resources in order to separately estimate each of the three parameters, namely, emissivity, area and temperature.

Accordingly, it would be desirable to provide an improved technique for extracting target features, such as emissivity, area and temperature, from multicolor radiant intensity measurements. In particular, it would be desirable to provide an improved technique for determining the emissivity, area and temperature of an object from multicolor radiant intensity measurements which requires fewer computational resources and which introduces less bias into the determination.

SUMMARY OF THE INVENTION

Methods and apparatus are therefore provided in accordance with embodiments of the present invention in order to determine the emissivity, temperature and area of an object in a manner that limits or eliminates the bias associated with the resulting emissivity, area and temperature. Additionally, the methods and apparatus of embodiments of the present invention are designed such that the emissivity and area of the object may be separately determined as functions dependent upon the temperature of the object. As such, methods and apparatus of embodiments of the present invention may only require a regression analysis of the temperature of the object without any regression analysis of the emissivity and area of the object, thereby potentially reducing the computational resources required to determine the emissivity, area and temperature relative to at least some prior techniques. Additionally, in instances in which the temperature of the object is known from a collateral source, the methods and apparatus of embodiments of the present invention may permit an immediate and direct determination of the emissivity and area of the object due to the dependence of the emissivity and area of the object upon its temperature.

In one aspect of the invention, a method and a corresponding apparatus, including a processor, are provided for determining the emissivity, area and temperature of an object. The method and apparatus of this embodiment simulate a measure of the radiant intensity of the object at each of a plurality of wavelengths. The emissivity and the area of the object are then determined as respective functions of the temperature of the object. The method and apparatus then perform a regression analysis of the temperature of the object without separately performing a regression analysis of the emissivity and the area of the object. By performing the regression analysis of the temperature of the object, the temperature of the object is determined with the emissivity and the area of the object being determinable based upon the temperature.

In accordance with another aspect of the present invention, a method of determining the emissivity, area and temperature of an object is provided which simulates a measure of the radiant intensity of the object at each of a first wavelength, a second wavelength and a third wavelength. A plurality of ratios of the measures of radiant intensity of the object are formed with each ratio being based upon a relationship of the measure of the radiant intensity of the object at one wavelength to the measure of the radiant intensity of the object at another wavelength. The emissivity of the object as a function of the temperature of the object is then determined for each of a plurality of the ratios. For example, three two-band intensity ratios would generally be defined for a three band sensor system. The area of the object as a function of the temperature of the object is then also determined for each of a plurality of the ratios based upon the emissivity of the object as determined for a respective ratio and also based upon the measure of radiant intensity of the object at a wavelength other than the wavelength associated with the respective ratio. The temperature of the object is then determined based upon the measure of radiant intensity of the object at each of the first, second and third wavelengths and the emissivity and the area of the object as determined as a function of the temperature of the object.

In one embodiment, the determination of the emissivity of the object and the determination of the area of the object both include the evaluation of components of radiant intensity attributable to both emission and reflectance. By considering both emission and reflectance, the methods and apparatus of embodiments of the present invention may reduce or eliminate bias associated with the resulting emissivity, area and temperature of the object.

The methods and apparatus of embodiments of the present invention determine the temperature of the object. This determination may, in one embodiment, be based upon a difference between the measure of the radiant intensity of the object and a model of the radiant intensity of the object. In this regard, the model of the radiant intensity of the object may be based upon the emissivity and the area of the object at a temperature that remains to be optimized. Additionally, the difference between the measure of the radiant intensity of the object and the model of the radiant intensity of the object may be evaluated at each of a plurality of predefined temperatures with the best temperature reported, in one embodiment, when the sum of squared differences between the measured intensities and the modeled intensities are minimized.

According to embodiments of the present invention, once the temperature of the object has been determined, the emissivity and the area of the object may be defined for each of the plurality of ratios, based upon the determined temperature of the object. An average of the emissivity and an average of the area of the object may then be determined based upon the emissivity and the area of the object that has been defined for each of the plurality of ratios.

BRIEF DESCRIPTION OF THE DRAWINGS

Figure 1A:
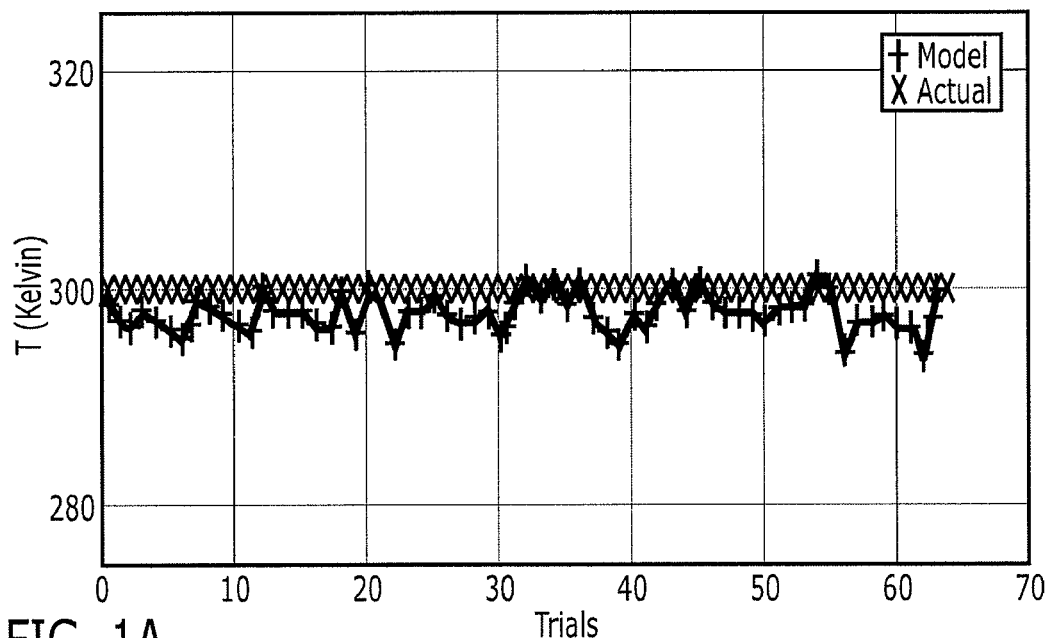
Figure 1B:
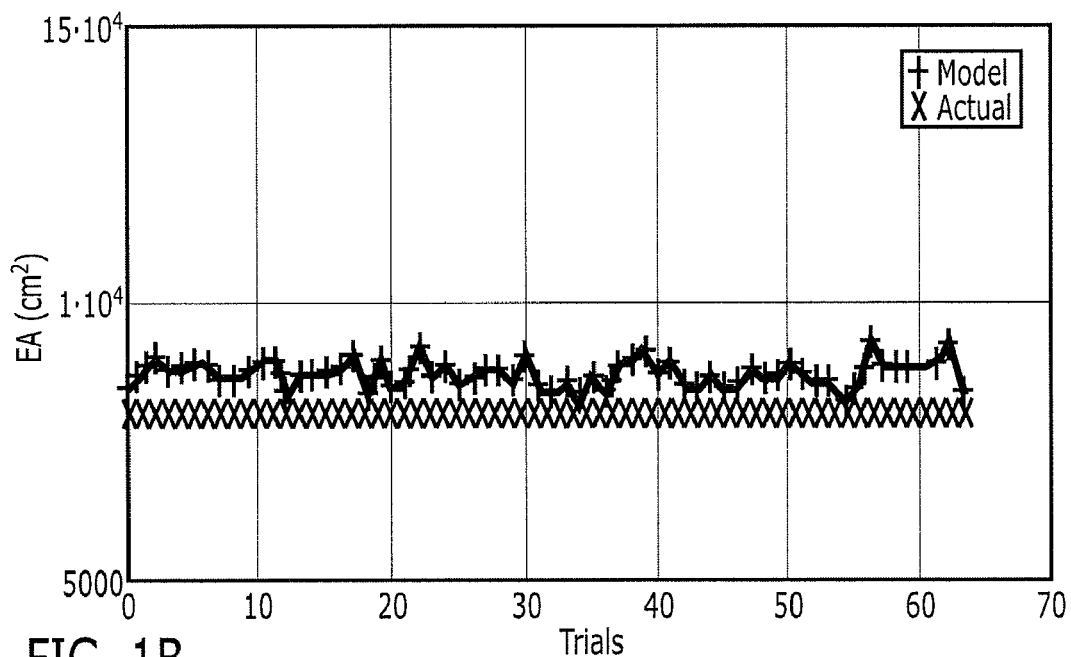
Figure 2:
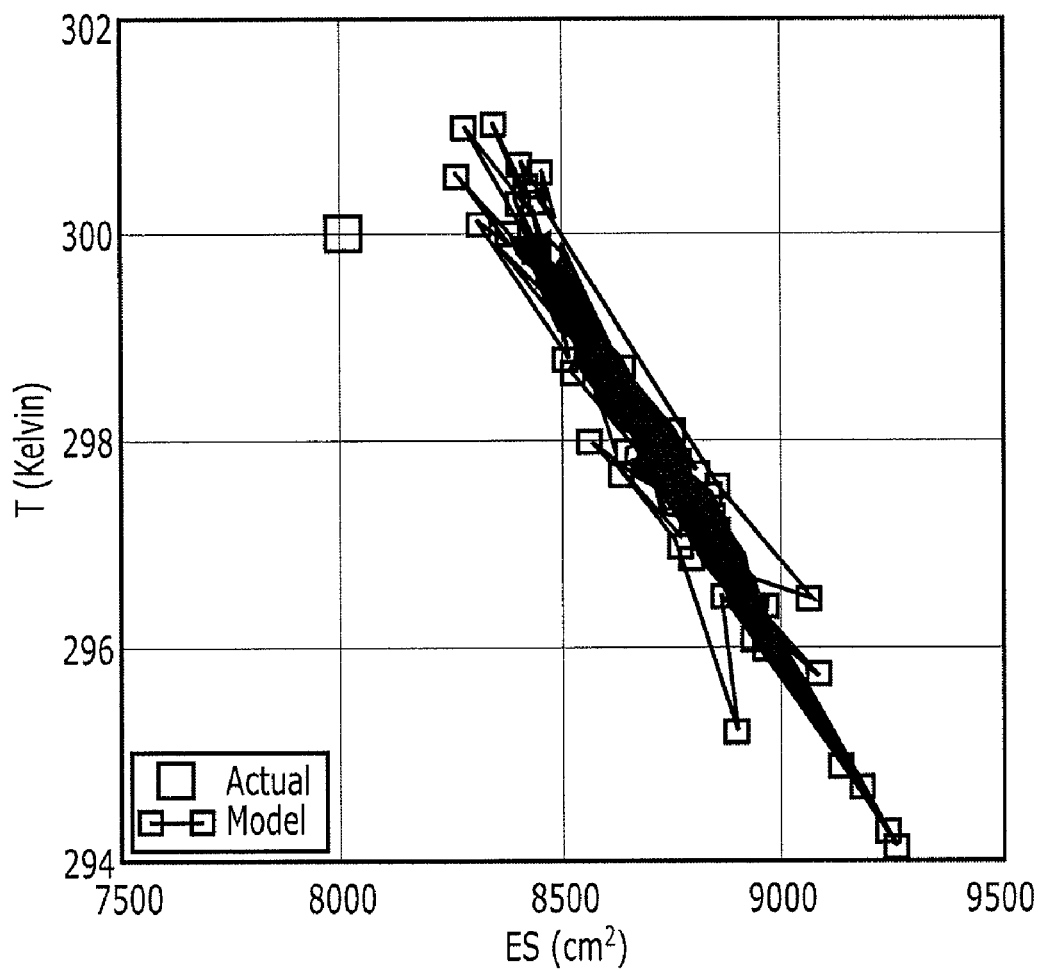
Figure 3:
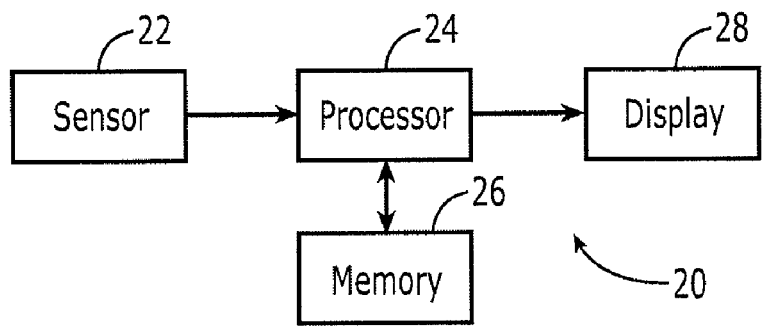
Figure 4:
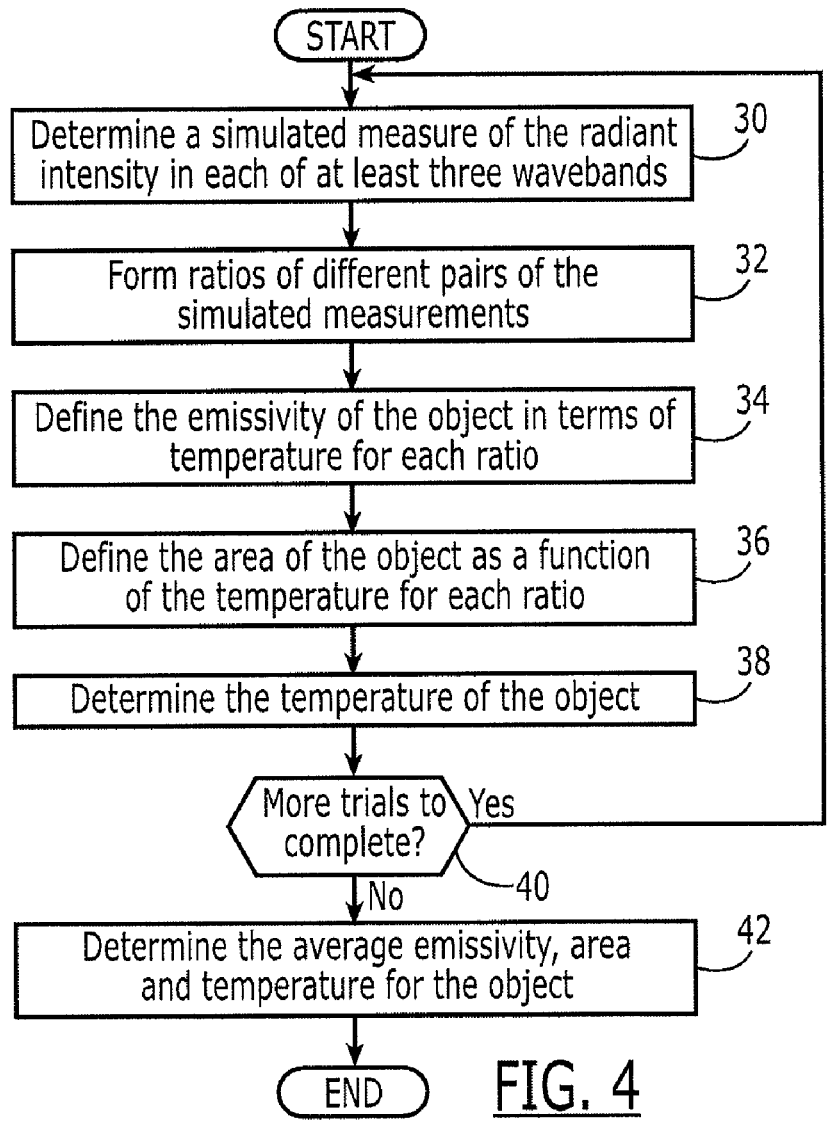
Figure 5A:
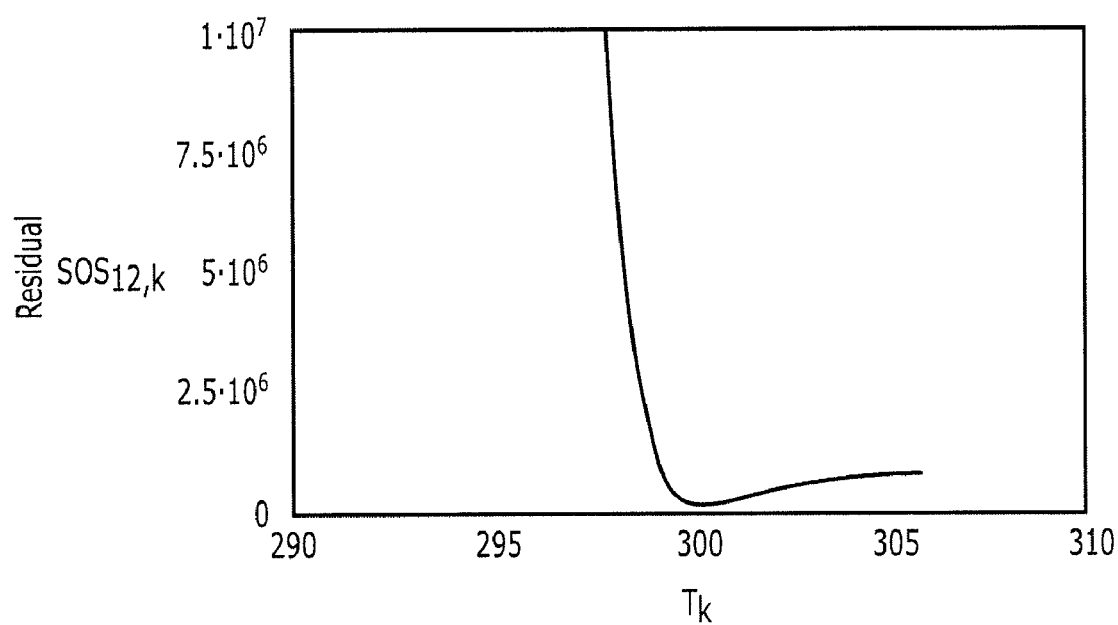
Figure 5B:
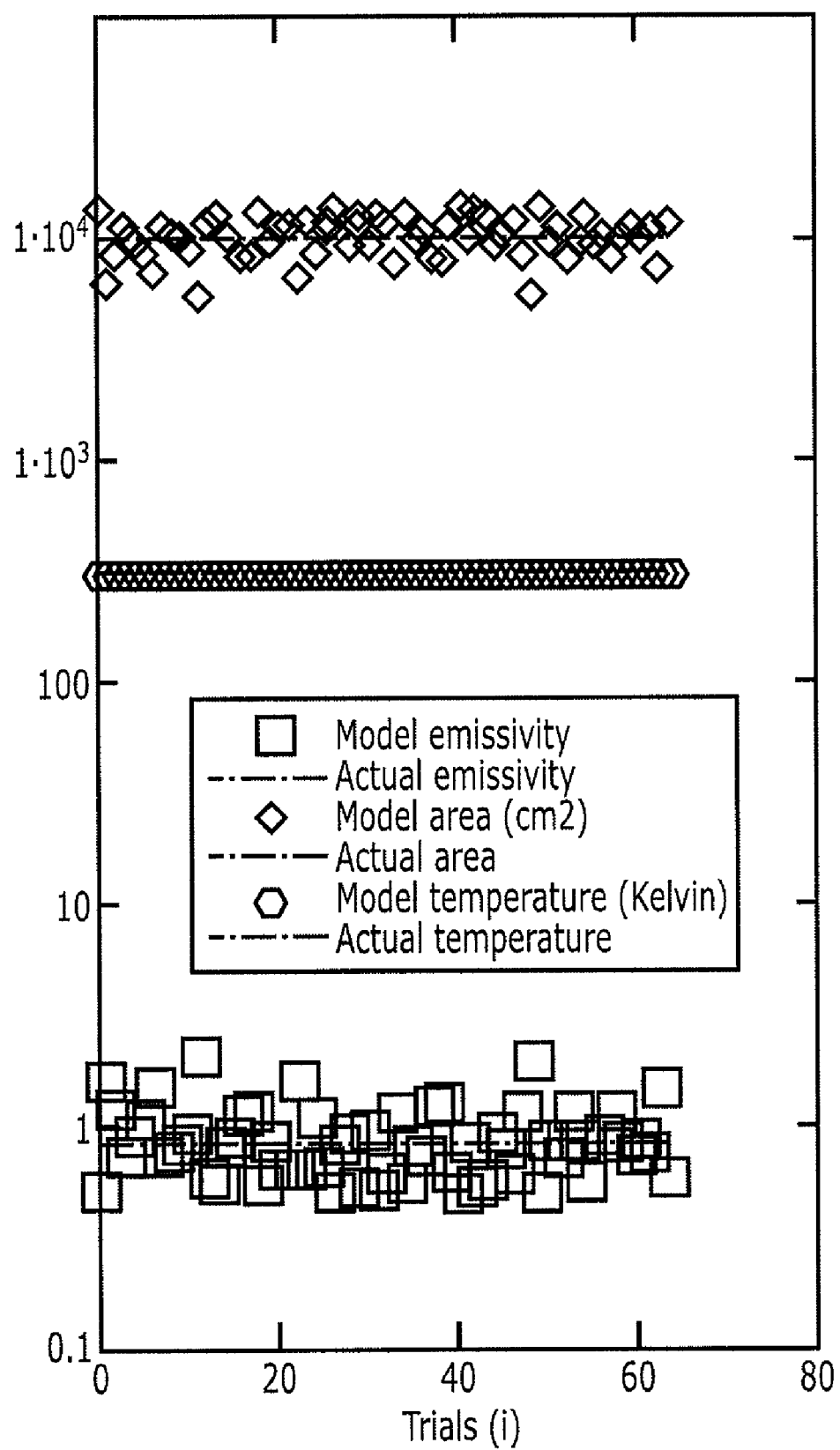
Figure 6A:
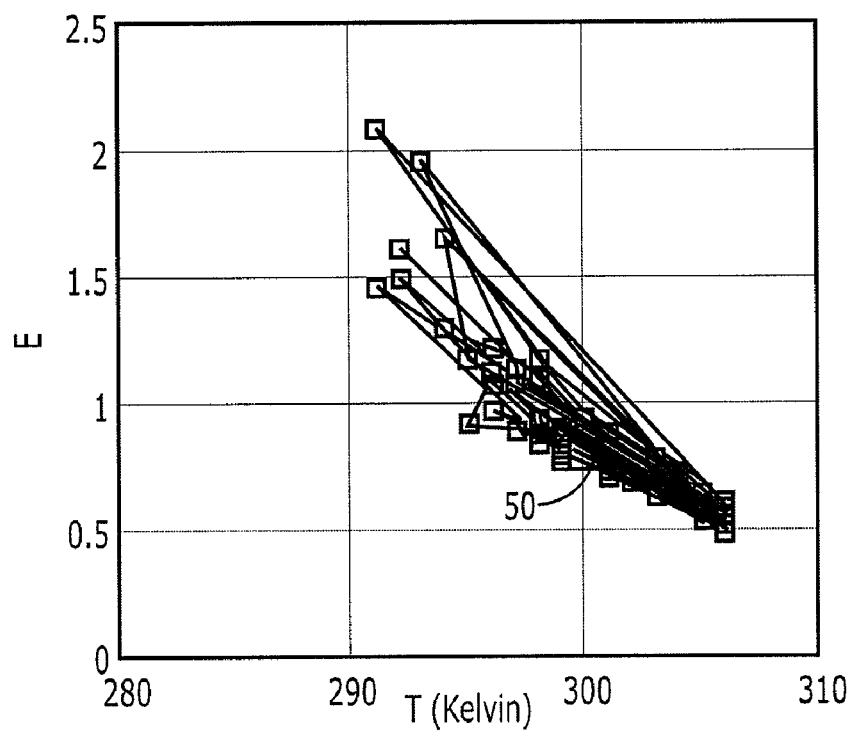
Figure 6B:
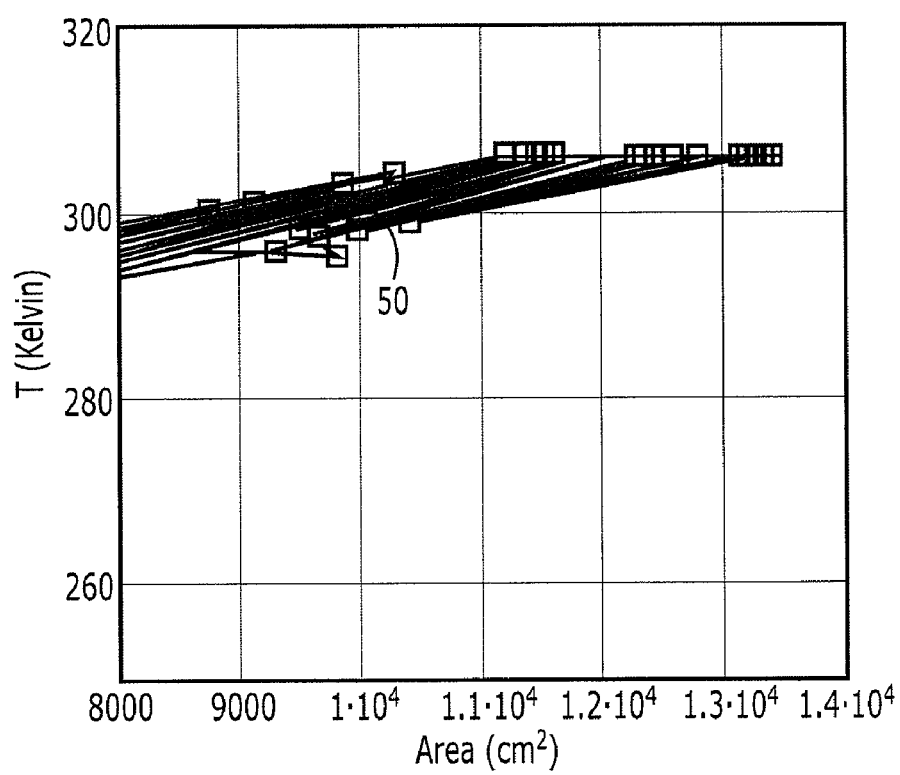
Figure 6C:
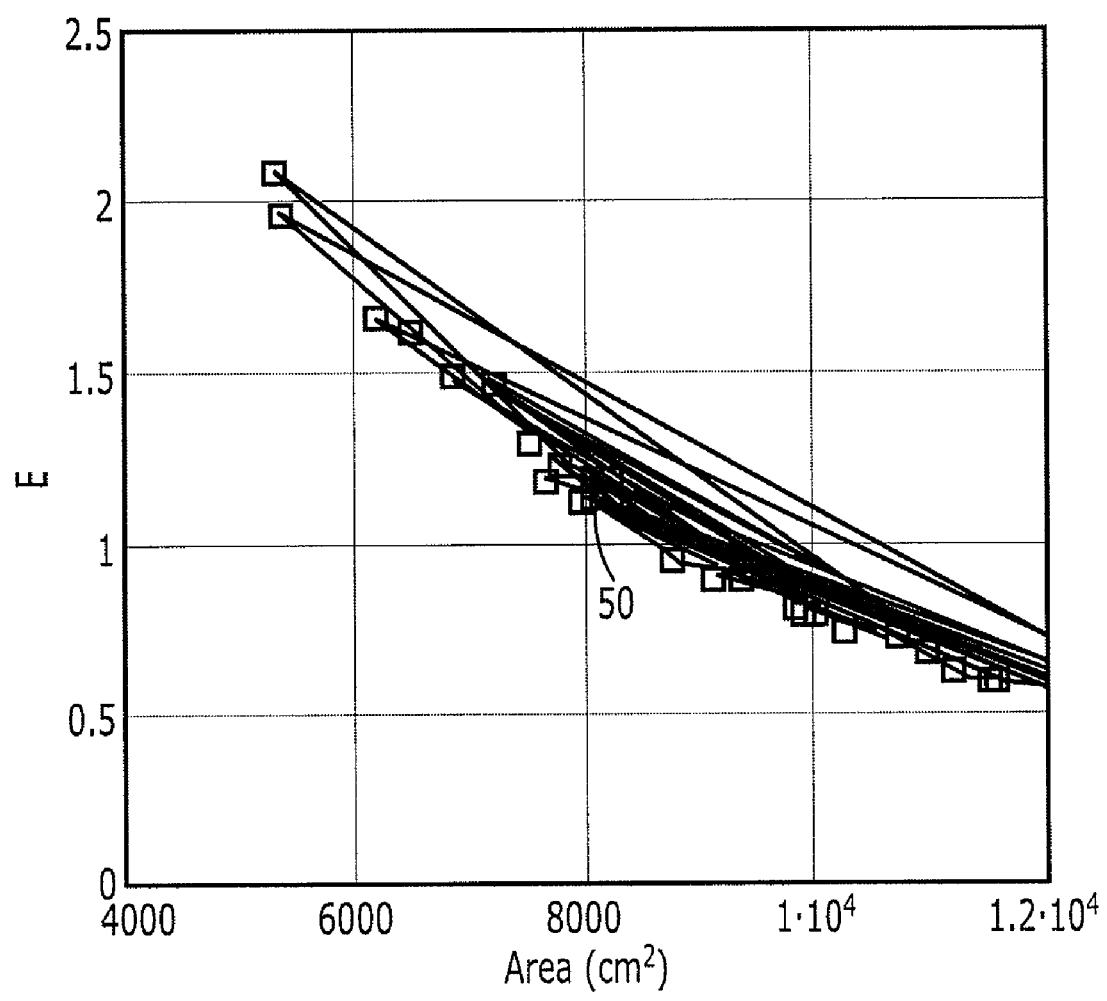

Having thus described the invention in general terms, reference will now be made to the accompanying drawings, which are not necessarily drawn to scale, and wherein:

FIGS. 1A and 1B are graphical representations of the temperature T and the emissivity area EA of an object as determined in accordance of a technique that relies upon two-color radiant intensity measurements relative to the actual temperature and emissivity area of the object;

FIG. 2 is another graphical representation of the temperature T and the emissivity area EA of an object as determined in accordance of a technique that relies upon two-color radiant intensity measurements relative to the actual temperature and emissivity area of the object;

FIG. 3 is a block diagram of an apparatus according to one embodiment of the present invention;

FIG. 4 is a flowchart of the operations performed in accordance with one embodiment of the present invention;

FIGS. 5A and 5B are graphical representations of a temperature optimization process and the Monte Carlo estimates of the emissivity, area and temperature of an object as determined in accordance with one embodiment of the present invention relative to the actual emissivity, area and temperature of the object; and FIGS. 6A, 6B and 6C are graphical representations of the emissivity and temperature covariance, temperature and area covariance and emissivity and area covariance, respectively, as determined in accordance with one embodiment of the present invention relative to the actual emissivity, area and temperature of the object.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 3, a block diagram of an apparatus 20 for determining the emissivity, area and temperature of an object is depicted. As described above, it may be desirable to determine the emissivity, area and temperature of an object in a variety of applications. For example, these applications may include ballistic missile defense and tactical air defense scenarios, wind tunnel testing, medical thermography, observational astronomy, astrophysics or the like.

As shown in FIG. 3, the apparatus 20 includes a sensor 22 and an associated processor 24. In one embodiment, the sensor includes a detector having an associated focal plane array.

The processor can be comprised of any one or more of a plurality of different computing devices, including a server, a workstation, a personal computer or the like, typically operating under software control.

The sensor 22 is configured to detect the radiant intensity of signals within at least three distinct wavebands. Typically, each of the wavebands lies within the infrared spectrum. Although the sensor may be configured to detect signals having a variety of different wavelengths, the sensor of one embodiment is configured to detect three distinct wavebands, namely, a first waveband centered at 6 microns, a second waveband centered at 11.5 microns and a third waveband centered at 25 microns. In this example, each waveband has a bandwidth of 1 micron. As should be apparent, the apparatus 20 of other embodiments of the present invention may include sensors that are configured to detect more than three wavebands, to detect wavebands centered at different wavelengths and to have wavebands having different bandwidths.

The sensor 22 may also be defined by a variety of other parameters, which will generally be predefined for a particular implementation. For example, the sensor is also generally defined by a slant range (R), an optics area (A), a quantum efficiency (QE), a total integration time (Tint) and an analog integration time (tintwell). In one embodiment, the slant range R is $1070 \times 10^5$ cm and the optics area A is $\pi/4 \times 45^2$ cm$^2$. In this embodiment, the quantum efficiency, which is a measure of the responsivity of the detector in terms of converting incoming photons to electrons, is 0.7 electrons/photons. Additionally, the analog integration time (tintwell) of this example may be one millisecond which is defined by the size of the capacitor that initially accumulates the electrons generated by the detector. Finally, the total integration time (Tint) may be 10 milliseconds resulting from the collection of ten consecutive frames from the analog capacitor.

As described above, an object may be defined in terms of its emissivity, area and temperature. As such, the total source-based intensity of an object that is measured by the sensor can be mathematically defined in terms of the emissivity, area and temperature of the object. For a sensor 22 configured to separately detect signals within three different wavebands, the total source-based intensity detected by the sensor within a first waveband J1, the total source-based intensity detected by the sensor within a second waveband J2 and the total source-based intensity detected by the sensor within a third waveband J3 can be defined as follows:

$$J1 = e*A*N1 + (1-e)*A*B1*F$$

$$J2 = e*A*N2 + (1-e)*A*B2*F$$

$$J3 = e*A*N3 + (1-e)*A*B3*F$$

wherein the suffixes 1, 2 and 3 designate the first, second and third wavebands, respectively.

In the foregoing equations, the total source-based intensity is based upon the emissivity e and the area A of the object. Additionally, the total source-based intensity is based upon both the object radiance N which is a function of object temperature T and the background radiance B. By taking into account not only the object radiance N, but also the background radiance B, the foregoing equations include both emission and reflectance components. As such, the inclusion of a reflectance component reduces or eliminates the bias in the resulting values of emissivity, area and temperature which are determined in accordance with embodiments of the present invention. Finally, the total source-based intensity is also based upon the geometric view factor F which is a predefined constant, such as about 0.5 for a particular sensor 22.

The object radiance N and the background radiance B are each defined by the Planck emission function as set forth below:

$$Planck(lam, T) := \frac{C1 \cdot dlam}{lam^5 \cdot (e^{\frac{C2}{lam \cdot T}} - 1)}$$

The Planck emission function therefore determines the radiance at a particular wavelength lam and a particular temperature T in kelvin with units of watts/cm$^2$/steradian. In the foregoing equation, C1 and C2 are Planck constants with C1 equaling $1.191 \times 10^{-12}$ watt cm$^2$/steradian and C2 equaling 1.438 cm kelvin and dlam is a small wavelength pass band centered at lam in units of cm. As noted above, the Planck emission function is a function of wavelength lam which, in turn, is defined as the center wavelength of a respective waveband under evaluation, such as 6 microns, 11.5 microns and 25 microns for the first, second and third wavebands, respectively, of the example of the sensor 22 described above. Finally, as also noted above, the Planck emission function is a function of the temperature of the object under consideration. Since the target object and the background object will likely have different temperatures, the corresponding Planck emission functions for the target object and the background object which constitute the object radiance N and the background radiance B in the foregoing equations will also be different. In one example, the background object may have a temperature of 250 Kelvin and the target object may have a temperature of 300 Kelvin. As will be noted, therefore, the equations which define the total source-based intensity are therefore not only dependent upon the emissivity e and the area A of the object, but also the temperature T of the object since the Planck emission function which defines the object radiance N is dependent upon the temperature of the object.

Since a sensor 22 introduces noise into every measurement, the measurement of the sensor will not only include the total source-based intensity, but will also include some amount of noise. In this regard, a sensor, such as an infrared sensor, generally includes shot noise, Johnson noise, readout noise and focal plane non-uniformity residuals. The shot noise may be dependent upon various parameters which define the sensor. In this regard, the shot noise may be dependent upon the detector area $A_d$ in cm$^2$, a focal ratio Fstop, the emissivity of the optics Emoptic and the temperature of the optics Toptic in kelvin. For signals captured by a sensor having a wavelength lam1 in cm, the background emitted photoconductive shot noise may be determined, in one example, as follows:

$$Ad := (50 \times 10^{-4})^2$$

$$Fstop := 4$$

$$Emoptic := 0.02$$

$$Toptic := 180$$

$$Blip1 := \sqrt{\frac{\pi \cdot Planck(lam1, Toptic) \cdot Emoptic}{4 Fstop^2 \cdot E1} QE \cdot Ad \cdot Tint}$$

$$blip = 114.125 \text{ in noise electron units}$$

wherein E1 serves to convert the units from electrons to photons. In this regard, E1 is the photon energy in Joules units and is specified by the mean wavelength lam1 according to h c/lam1 where h is Planck's constant $6.625 \times 10^{-34}$ watt sec$^2$, c is the speed of light $2.99793 \times 10^{10}$ cm/second and lam1 is the mean wavelength in cm for band 1.

Based upon the contributions of the noise components, that is, the Johnson noise component (noise), the shot noise component (shot), the readout noise component (ndte) and the non-uniformity residuals (nFPA), a signal to noise ratio SNR may be determined for signals received by the sensor 22 within a respective waveband (as designated by a suffix of 1, 2 or 3 for the first, second and third wavebands, respectively). For example, the SNR for signals within the first waveband may be expressed as follows:

$$SNR1_i := \frac{nJ1_i}{\sqrt{(noise1_i)^2 + (shot1_i)^2 + (ndet1_i)^2 + nFPA1_i)^2}}$$

The noise components generally vary and may be defined, for example, by a distribution function. In order to take into account the variability with respect to sensor noise, a number of different trials designated i may be conducted with each trial permitting the noise components to have different random values. As such, the signal to noise ratio that is defined above reflects the signal to noise ratio for signals received with a first waveband during trial i. While the trials may be defined in various manners, the methods and apparatus 20 of one embodiment utilize Monte Carlo simulation for determining the contributions of each noise component during each of a plurality of different trials, such as trials of 64, 128, 256, 512 and so forth, in accordance with the random selection of noise values from respective statistical distributions.

Also relative to the foregoing equation defining the signal to noise ratio, the denominator is an expression of the noise during a particular trial i, while the numerator represents a simulated measurement $nJ1_i$ by the sensor 22 within the first passband during trial i in electron units. The simulated measurement of the sensor $nJ1_i$ includes the expected contribution from the object as well as the sensor noise that is added thereto. In terms of the expected contribution from the object, a simulated object can be defined having a predefined emissivity, area and temperature and being at a predefined range relative to the sensor. Based upon the foregoing characteristics, the radiant intensity detected by the sensor from the object may be determined. Additionally, the additive sensor noise may be determined as described above in accordance with, for example, a Monte Carlo simulation based upon the contributions from the various noise components, that is, Johnson noise, shot noise, readout noise and non-uniform residuals. The sum of the expected contribution from the object and the additive sensor noise comprises the simulated sensor measurement $nJ1_i$.

As described below, the determination of the emissivity, the area and the temperature of an object are generally determined in terms of electron counts, as opposed to in terms of photons. As such, the total source-based intensity J may be converted from photons (in terms of watts/steradian) to electrons by multiplication with a conversion factor. The conversion factor is dependent upon the wavelength of the signals detected by the sensor 22 and, as such, a separate conversion factor is generally utilized in conjunction with each of the different wavebands supported by a sensor. By way of example, a conversion factor associated with a first waveband 1 can be expressed as follows:

$$factorJton1 := \frac{1}{R^2 E1} Aoptics\ QE\ Tint\ \tau1$$

wherein R is the range between the object and the sensor in cm, Aoptics is the collection area of the telescope in cm$^2$, QE is the quantum efficiency of the detector in electrons per photon, Tint is the photon integration time in seconds and $\tau1$ is the total transmittance, that is, the cumulative transmittance through the atmosphere and through the optics and any filters of the sensor in band 1.

In accordance with embodiments of the present invention, the emissivity and the area of an object may be determined as a function of the temperature of the object. As shown in block 30 of the flowchart depicted in FIG. 4, the processor 24 initially determines a simulated measurement of the radiant intensity detected by the sensor 22 for signals arriving in each of a first waveband 1, a second waveband 2 and a third waveband 3. These simulated measurements may be based upon a number of predefined parameters defining the emissivity, area, temperature and range of the object and may be converted to electron units by multiplication with a respective conversion factor. As such, the simulated measurement of the sensor for signals within the first waveband, the second waveband and the third waveband may be designated as $nJ1_i$, $nJ2_i$ and $nJ3_i$, respectively, wherein the subscript references a particular trial or simulation i. The processor 24 then forms ratios of different pairs of the simulated measurements of radiant intensity, thereby defining ratios nJ1/nJ2, nJ1/nJ3 and nJ2/nJ3, as shown in block 32.

In accordance with embodiments of the present invention, the processor 24 may define the emissivity of the object in terms of the temperature of the object. In particular, the processor may determine emissivity of the object as a function of the temperature of the object for each of the plurality of ratios, namely, nJ1/nJ2, nJ1/nJ3 and nJ2/nJ3. See block 34. By way of example, the emissivity of the object for the ratio nJ1/nJ2 can be defined as follows:

$$eeps12_{i,k} := \frac{FB1\,factorJton1 - FB2\,factorJton2\,\frac{nJ1_i}{nJ2_i}}{\frac{nJ1_i}{nJ2_i}(NN2_k - FB2)factorJton2 - (NN1_k - FB1)factorJton1}$$

wherein $eeps12_{i,k}$ represents the emissivity of the object with the suffix 12 designating that the emissivity is based upon the ratio nJ1/nJ2 and the subscripts $_{i,k}$ representing that the emissivity is for trial i and at temperature k. As described above, F is a predefined form factor, B1 and B2 are the Planck emission functions evaluated at the temperature of a background element for signals in the first and second wavebands, respectively, and NN1 and NN2 are the Planck emission functions evaluated at the temperature k of the object for signals in the first and second wavebands, respectively, at a temperature k. Although the foregoing equation represents the emissivity of the object for the ratio of nJ1/nJ2, similar expressions for the emissivity of the object as a function of each of the other ratios are also developed.

In accordance with embodiments of the present invention, the processor 24 also determines the area of the object as a function of the temperature of the object for each of the plurality of the ratios, such as nJ1/nJ2, nJ1/nJ3 and nJ2/nJ3. See block 36. In particular, the area of the object is based upon the emissivity of the object as determined for a respective ratio and the measure of radiant intensity of the object at a wavelength other than the wavelengths associated with the respective ratio. For example, the area of the object which is based upon the ratio of nJ1/nJ2 may be designated as AA3 and expressed as follows:

$$AA3_{i,k} := \frac{\frac{nJ3_i}{factorJton3}}{eeps12_{i,k}NN3_k + (1 - eeps12_{i,k})B3F}$$

In the foregoing equation, $AA3_{i,k}$ is the area of the object for trial i at temperature k. Similar expressions for the area of the object based upon each of the other ratios, such as area AA2 based upon the emissivity of the object premised upon the ratio nJ1/nJ3 and area AA1 based upon the emissivity premised upon the ratio nJ2/nJ3, may be similarly developed.

As noted above, the emissivity and area of the object that are determined in accordance with the foregoing equations are dependent upon the temperature of the object. As such, the processor 24 may determine the temperature of the object based upon the measure of radiant intensity of the object at each of the first, second and third wavelengths and further based on the emissivity and the area of the object as determined as a function of the temperature of the object. See block 38 of FIG. 4. While the temperature of the object may be determined in various manners, the temperature of the object is determined by the processor in one embodiment based upon minimizing a sum of squared residuals SOS between a simulated measure of the intensity of the object and a model of the radiant intensity of the object with the model of the radiant intensity of the object being based upon the emissivity and the area of the object at a pre defined temperature. For example, the sum of squared residuals may be defined for a trial i and the temperature k as follows:

$$SOS_{i,k}:=[sumnJ_i-sum(AA_{i,k}(eeps_{i,k}planckmodel_{i,k+(1-eeps_{i,k})}planckB))]^2$$

As referenced above, $AA_{i,k}$ is the derived area of the object during trial i at temperature k index, $eeps_{i,k}$ is the derived emissivity at the same temperature k index and PlanckB is the assumed known background Planck radiance, PlanckB. Additionally, $sumJ_i$ is the sum of the simulated measures of the radiant intensity of the object during trial i at each of the plurality (that is, 3) of wavebands as set forth below in conjunction with an embodiment having first, second and third wavebands. Conversion factors for watts per steradian to electron counts per detector are also assumed.

$$sumnJ_i:=nJ1_i+nJ2_i+nJ3_i$$

Furthermore, the model of the electron count radiant intensity is defined by the product of the area of the object $AA_{i,k}$ and $sumnplanckmodel_{i,k}$ which is defined for trial i and temperature k as follows:

$$sumnplanckmodel_{i,k}:=AA_{i,k}\{[eeps_{i,k}NN1_k+(1-eeps_{i,k})B1F]factorJton1+[eeps_{i,k}NN2_k+(1-eeps_{i,k})B2F]factorJton2+[eeps_{i,k}NN3_k+(1-eeps_{i,k})B3F]factorJton3\}$$

In the foregoing equation, B1, B2 and B3 are the known background radiance in the first, second and third sensor bands, respectively, in units of watts/cm$^2$/steradian.

For a particular trial i, the processor 24 may determine the sum of squared residuals SOS; for a variety of temperatures k. For example, FIG. 5A provides a graphical representation of the relationship of the sum of squared residuals $SOS_i$ for Monte Carlo trial #12 for a variety of temperatures k from 290 to 310 kelvin. In order to most accurately estimate the emissivity, area and temperature of the object, the processor may define the temperature to be the best temperature which minimizes the sum of squared residuals (in the case in FIG. 5A the best temperature is estimated to be 300 kelvin.) Based upon the defined temperature, the emissivity and the area of the object can then be determined in accordance with the foregoing equations for eeps and AA. FIG. 5B shows the estimated emissivity eeps and object area AA based on the best temperature Tbest as for the full range of Monte Carlo trials from 1 to 64 and compares their estimates with the input truth, i.e., actual, values shown as dash dot lines. It is noted that the mean estimates of all the parameters are visually unbiased (i.e., estimates are evenly scattered about the truth), unlike biased two color temperature and emissivity area product algorithms which do not take into account reflected radiation.

As described above, the processor 24 may repeat the determination of the emissivity, area and temperature of an object for a plurality of different trials, each of which may define the sensor noise contributions somewhat differently based upon the distributions associated with each noise component. See block 40 of FIG. 4. After conducting a plurality of trials and determining the emissivity, area and temperature of an object for each trial, the processor can then average the values of the emissivity, area and temperature determined for the plurality of trials as shown in block 42. As such, the methods and apparatus 20 of embodiments of the present invention can provide accurate estimations of the emissivity, area and temperature of an object with little, if any, bias.

For example, FIG. 6 depicts the actual values of the emissivity (0.8), area ($1\times10^4$ cm$^2$) and temperature (300 Kelvin) as well as the values of emissivity, area and temperature determined for each of 64 trials designated i=0, . . . 63. As depicted, the estimations of the emissivity, area and temperature closely approximate the actual emissivity, area and temperature of the object and, as a result, of the relatively uniform scattering of the estimations about the actual values, the average values of the emissivity, area and temperature even more closely approximate the actual emissivity, area and temperature of the object. In this example, the average estimated emissivity is 0.879 and the standard deviation of the estimated emissivity is 0.348. Additionally, the average estimated area is $9.952\times10^3$ cm$^2$ and the standard deviation of the estimated area is $1.975\times10^3$ cm$^2$. Finally, the average estimated temperature is 300.188 Kelvin and the standard deviation of the estimated temperature is 4.528 Kelvin.

Other graphical representations of the estimated emissivity, area and temperature relative to the actual emissivity, area and temperature are reflected in FIGS. 6A, 6B and 6C. In this regard, FIG. 6A depicts the emissivity and temperature covariance, FIG. 6B depicts the temperature and area covariance and FIG. 6C depicts the emissivity and area covariance. In each of FIGS. 6A, 6B and 6C, rectangle 50 represents the actual values, while the other lines represent the estimated values with the scattering of the estimated values attributable, at least in part, to sensor noise contributions, which may, of course, be reduced by the use of a sensor having lower noise characteristics.

As shown in FIG. 3, the apparatus 20 is typically embodied by a processor 24 and an associated memory device 26, both of which are commonly comprised by a computer or the like. In this regard, as indicated above, the method of embodiments of the present invention can be performed by the processor manipulating data stored by the memory device. The apparatus can also include a display 28 for presenting information relative to performing embodiments of the method of the present invention, including information relating to the emissivity, area and temperature of an object as determined according to embodiments of the present invention. To plot information relative to performing embodiments of the method of the present invention, the apparatus can further include a printer.

Also, the apparatus 20 can include a means for locally or remotely transferring the information relative to performing embodiments of the method of the present invention. For example, the apparatus can include a modem to transfer information to other computers or the like. Further, the apparatus can include an interface to a network, such as a local area network (LAN), and/or a wide area network (WAN). For example, the computer can include an Ethernet Personal Computer Memory Card International Association (PCMCIA) card configured to transmit and receive information to and from a LAN, WAN or the like.

According to one aspect of the present invention, the apparatus 20 generally operates under control of a computer program product. The computer program product for performing the methods of embodiments of the present invention includes a computer-readable storage medium, such as the memory device 26, and computer-readable program code portions, such as a series of computer instructions, embodied in the computer-readable storage medium.

In this regard, FIG. 4 is a flowcharts of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as processor 24, to produce a machine, such that the instructions which execute on the computer or other programmable apparatus create means for implementing the functions specified in the flowchart block(s) or step(s). These computer program instructions may also be stored in a computer-readable memory, such as the memory device 26, that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block (s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining emissivity, temperature and area of an object, the method comprising:
    simulating a measure of a radiant intensity of the object at each of a first wavelength, a second wavelength and a third wavelength;
    forming a plurality of ratios of the measures of radiant intensity of the object, wherein each ratio is based upon a relationship of the measure of radiant intensity of the object at one wavelength to the measure of radiant intensity of the object at another wavelength;
    determining the emissivity of the object as a function of the temperature of the object for each of a plurality of the ratios;
    determining the area of the object as a function of the temperature of the object for each of a plurality of the ratios based upon the emissivity of the object as determined for a respective ratio and the measure of radiant intensity of the object at a wavelength other than the wavelengths associated with the respective ratio; and
    determining the temperature of the object based upon the measure of radiant intensity of the object at each of the first, second and third wavelengths and the emissivity and the area of the object as determined as a function of the temperature of the object
    wherein determining the emissivity, area and temperature of the object is performed by a processor.

2. A method according to claim 1 wherein each of determining the emissivity of the object and determining the area of the object comprises evaluating components of radiant intensity attributable to both emission and reflectance.

3. A method according to claim 1 wherein determining the temperature comprises determining the temperature based upon a difference between the measure of the radiant intensity of the object and a model of the radiant intensity of the object, wherein the model of the radiant intensity of the object is based upon the emissivity and the area of the object at a predefined temperature.

4. A method according to claim 3 wherein determining the temperature further comprises evaluating the difference between the measure of the radiant intensity of the object and a model of the radiant intensity of the object at each of a plurality of predefined temperatures.

5. A method according to claim 1 further comprising defining the emissivity and the area of the object for each of a plurality of the ratios based upon the determined temperature of the object.

6. A method according to claim 5 further comprising determining an average of the emissivity and the area of the object over the plurality of the ratios.

7. A method of determining emissivity, temperature and area of an object, the method comprising:
    simulating a measure of a radiant intensity of the object at each of a plurality of wavelengths;
    forming a plurality of ratios of the measures of radiant intensity of the object, wherein each ratio is based upon a relationship of the measure of radiant intensity of the object at one wavelength to the measure of radiant intensity of the object at another wavelength;
    determining the emissivity and the area of the object as respective functions of the temperature of the object including determining the area of the object as a function of the temperature of the object for each of a plurality of the ratios based upon the emissivity of the object as determined for a respective ratio and the measure of radiant intensity of the object at a wavelength other than the wavelengths associated with the respective ratio; and performing, with a processor, a regression analysis of the temperature of the object without separately performing a regression analysis of the emissivity and the area of the object, wherein performing the regression analysis of the temperature of the object determines the temperature of the object from which the emissivity and the area of the object are determinable.

8. A method according to claim 7 wherein determining the emissivity of the object comprises:

determining the emissivity of the object as a function of the temperature of the object for each of a plurality of the ratios.

9. A method according to claim 7 wherein determining the emissivity and the area of the object comprises evaluating components of radiant intensity attributable to both emission and reflectance.

10. A method according to claim 7 wherein performing the regression analysis of the temperature comprises determining the temperature based upon a difference between the measure of the radiant intensity of the object and a model of the radiant intensity of the object, wherein the model of the radiant intensity of the object is based upon the emissivity and the area of the object at a predefined temperature.

11. A method according to claim 10 wherein determining the temperature further comprises evaluating the difference between the measure of the radiant intensity of the object and a model of the radiant intensity of the object at each of a plurality of predefined temperatures.

12. A method according to claim 7 further comprising defining the emissivity and the area of the object based upon the determined temperature of the object.

13. An apparatus for determining emissivity, temperature and area of an object, the apparatus comprising a processor configured to simulate a measure of a radiant intensity of the object at each of a first wavelength, a second wavelength and a third wavelength, the processor also configured to determine the emissivity of the object by forming a plurality of ratios of the measures of radiant intensity of the object, wherein each ratio is based upon a relationship of the measure of radiant intensity of the object at one wavelength to the measure of radiant intensity of the object at another wavelength, the processor also configured to determine the emissivity and the area of the object as respective functions of the temperature of the object including determination of the area of the object as a function of the temperature of the object for each of a plurality of the ratios based upon the emissivity of the object as determined for a respective ratio and the measure of radiant intensity of the object at a wavelength other than the wavelengths associated with the respective ratio, and the processor further configured to perform a regression analysis of the temperature of the object without separately performing a regression analysis of the emissivity and the area of the object, wherein the processor, in the performance of the regression analysis of the temperature of the object, is configured to determine the temperature of the object from which the emissivity and the area of the object are determinable.

14. A apparatus according to claim 13 wherein the processor is further configured to determine the emissivity of the object as a function of the temperature of the object for each of a plurality of the ratios.

15. An apparatus according to claim 13 wherein the processor is configured to determine the emissivity and the area of the object by evaluating components of radiant intensity attributable to both emission and reflectance.

16. An apparatus according to claim 13 wherein the processor is configured to perform the regression analysis of the temperature by determining the temperature based upon a difference between the measure of the radiant intensity of the object and a model of the radiant intensity of the object, wherein the model of the radiant intensity of the object is based upon the emissivity and the area of the object at a predefined temperature.

17. An apparatus according to claim 16 wherein the processor is further configured to determine the temperature by evaluating the difference between the measure of the radiant intensity of the object and a model of the radiant intensity of the object at each of a plurality of predefined temperatures.

18. An apparatus according to claim 13 wherein the processor is configured to define the emissivity and the area of the object based upon the determined temperature of the object.

* * * * *